(12) United States Patent
Jahagirdar et al.

(10) Patent No.: US 6,304,763 B1
(45) Date of Patent: *Oct. 16, 2001

(54) COMMUNICATION DEVICE HAVING MULTIPLE DISPLAYS AND METHOD OF OPERATING THE SAME

(75) Inventors: Ketan R. Jahagirdar, Palatine; William P. Alberth, Jr., Crystal Lake; Rolland R. Hackbart, Buffalo Grove; Rashid M. Osmani, Mundelein; Stephen V. Cahill, Palatine, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/562,396

(22) Filed: May 1, 2000

Related U.S. Application Data

(62) Division of application No. 08/869,543, filed on Jun. 5, 1997.
(51) Int. Cl.⁷ ....................................................... H04B 1/38
(52) U.S. Cl. ............................ 455/566; 455/575; 455/90; 345/169

(58) Field of Search .............................. 455/90, 550, 575, 455/566, 38.4, 351; 345/169, 1, 10, 25; 379/428, 433, 455

(56) References Cited

U.S. PATENT DOCUMENTS

| Re. 34,976 | * | 6/1995 | Helferich et al. | 455/556 |
| 5,148,481 | * | 9/1992 | Metroka et al. | 455/563 |
| 5,574,772 | * | 11/1996 | Scalisi et al. | 455/90 |
| 6,125,286 | * | 9/2000 | Jahagirdar et al. | 455/566 |

FOREIGN PATENT DOCUMENTS 6-37697 * 2/1994 (JP) ....................................... 455/90

* cited by examiner

Primary Examiner—Doris H. To
(74) Attorney, Agent, or Firm—Brian M. Mancini

(57) ABSTRACT

A portable communication device (102) includes a housing (105), a first display area (130), and a second display area (132). The first display area (130) is disposed in and outwardly directed from a front (120) of the housing (105), and the second display area (132) is disposed in and outwardly directed from a side (122) of the housing (105). The housing (105) may include a housing portion (114) movable to an open position and a closed position, where the second display area (132) is covered by the housing portion (114) when positioned in one of the first and the second positions.

11 Claims, 6 Drawing Sheets

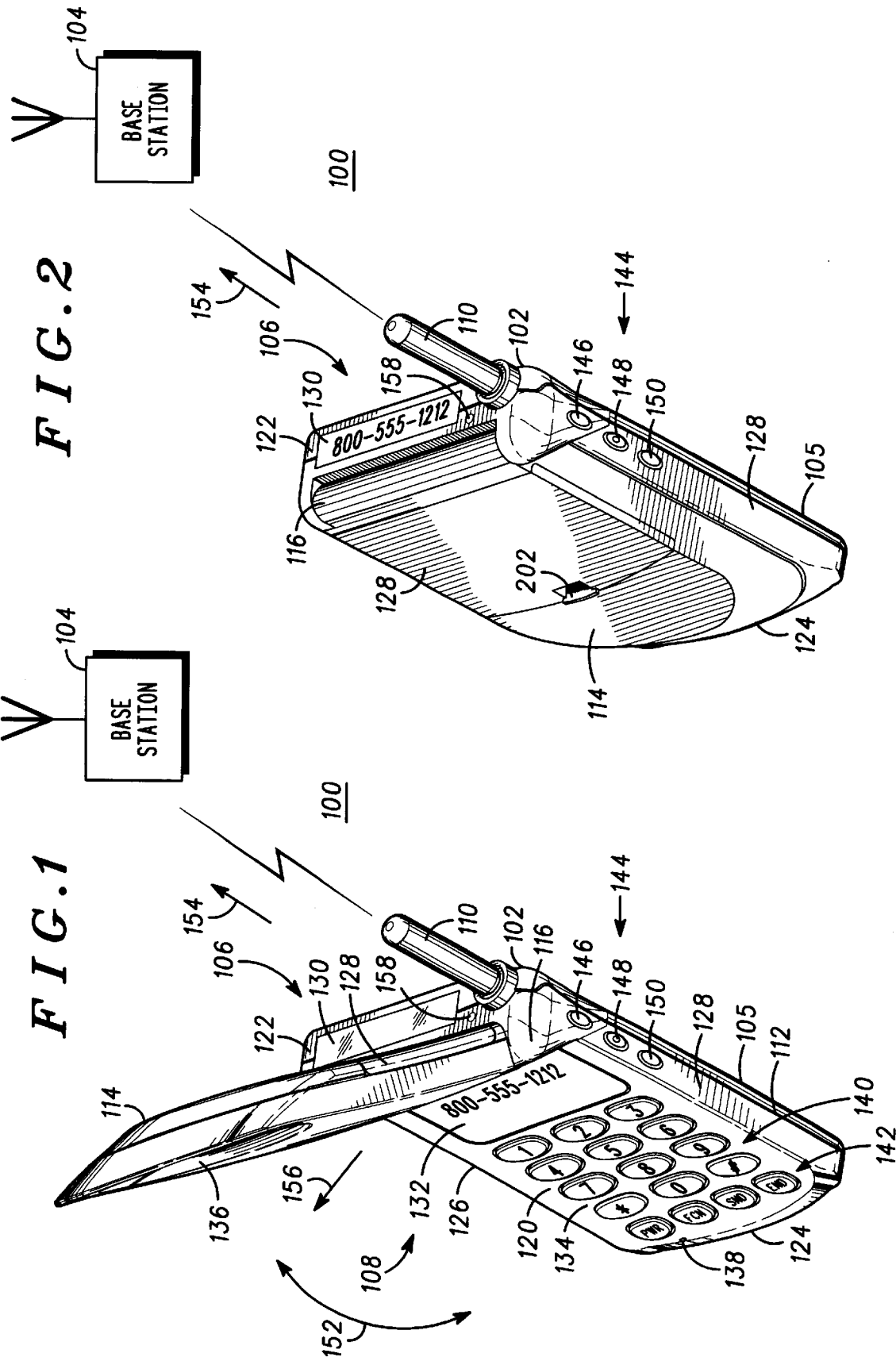

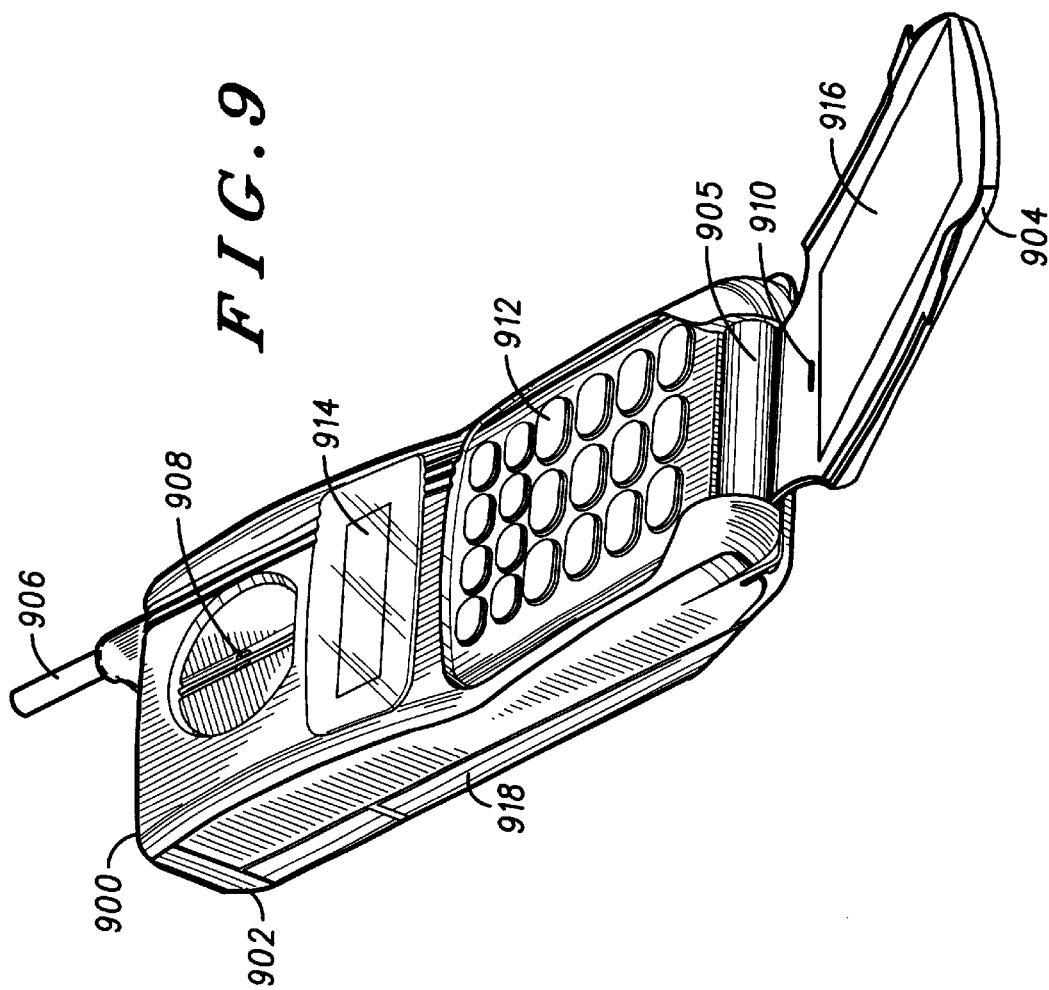
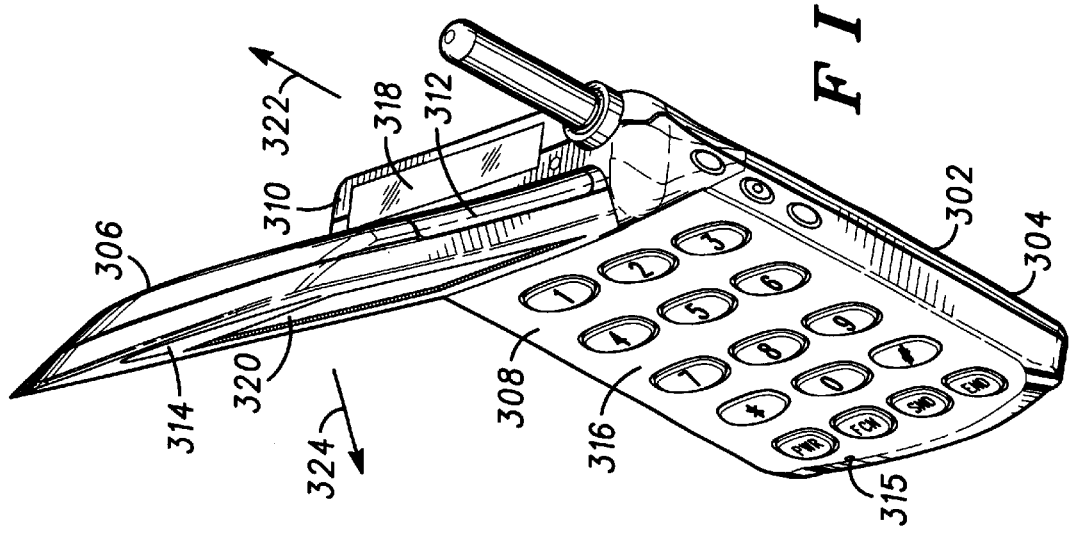

COMMUNICATION DEVICE HAVING MULTIPLE DISPLAYS AND METHOD OF OPERATING THE SAME

The present application is a divisional application of parent application Ser. No. 08/869,543 filed on Jun. 5,1997 and assigned to the assignee of the parent application.

FIELD OF THE INVENTION

The present invention relates generally to communication devices having multiple displays, and more particularly to portable radio communication devices having multiple displays.

BACKGROUND OF THE INVENTION

Many portable communication devices, such as cellular telephones, include a housing defining relatively large front and rear surfaces with thin sides. Such devices may be thin enough to fit within a pocket of clothing or to carry on a belt or a holster. Typically, the front surface of the device has a user interface which includes one or more components such as a keypad or a display. When the device is carried as described above, the user interface may not be very accommodating to a user. For example, when such a device is carried on a belt of a user, the user interface is completely or partially obstructed from the user's view.

In addition, some devices have flaps which cover the user interface for protection against various elements such as dirt or rain, or for other reasons such as for protection against inadvertent actuations at the keypad. Although highly beneficial, such flaps may similarly or further inhibit viewing of the user interface.

Accordingly, what is needed is a communication-device having a user interface that is more accommodating to a user, and additionally one that does not substantially increase a power consumption or cost of the communication device.

BRIEF DESCRIPTION OF THE DRAWINGS

FIG. 1 is an illustration of a mobile station having a first display area and a second display area.

FIG. 2 is an illustration of the mobile station of FIG. 1.

FIG. 3 is an illustration of an alternate embodiment of a mobile station.

FIG. 9 is an illustration of another alternate embodiment of a mobile station.

DETAILED DESCRIPTION OF THE PREFERRED EMBODIMENTS

Figure 4:
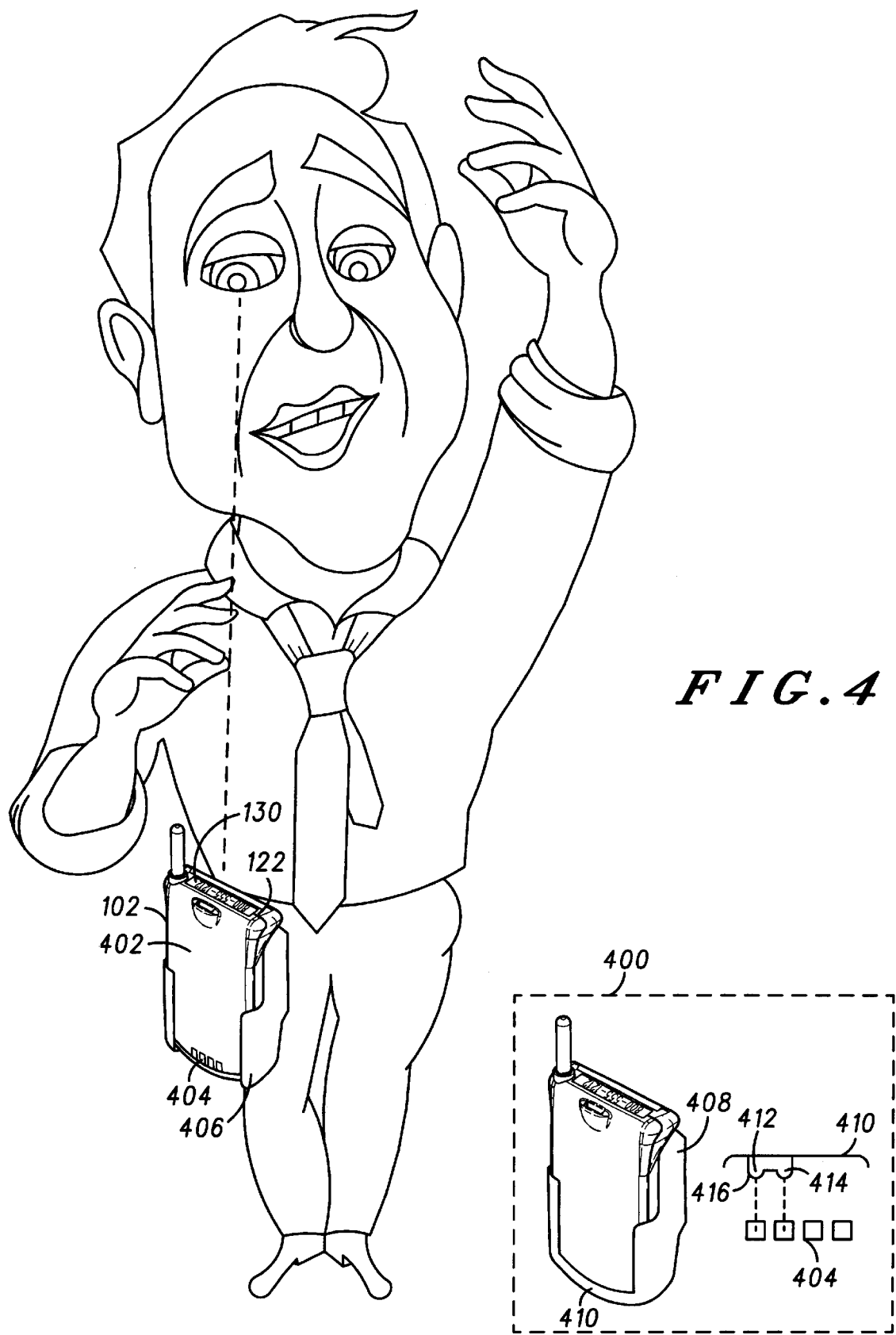
FIG. 4 is an illustration of the mobile station being worn in a holster by a user.

According to the present invention, a portable communication device comprises a housing, a first display area, and a second display area. The first display area is disposed in and outwardly directed from a front of the housing and the second display area is disposed in and outwardly directed from a side of the housing. The housing may include a housing portion movable to an open position and a closed position, where the first display area is covered by the housing portion in one of the first and the second positions.

FIG. 1 shows a communication system 100 comprising a mobile station 102 and a base station 104. Mobile station 102 and base station 104 communicate via radio frequency (RF) signals to provide wireless communications and features such as paging, telephone, and short messaging features. Preferably, communication system 100 provides cellular telephone communications and additional communication services.

Mobile station 102 comprises a housing 105, a user interface 106, and a user interface 108. To transmit and receive the RF signals to and from base station 104, mobile station 102 also includes an antenna 110. Mobile station 102 may also include an accessory jack 158.

Housing 104 includes a housing portion 112 and a housing portion 114. Housing portion 114 is movable between a first position and a second position. The first position may be referred to as an open position, such as that shown in FIG. 1, and the second position may be referred to as a closed position, such as that shown in FIG. 2. Housing portion 114 may be generally referred to as a movable element or a flap. Also, housing portions 112 and 114 may be generally referred to as lower and upper housing portions, respectively. Housing 104 is made from a durable material, preferably plastic.

In the embodiment shown, housing portion 114 is coupled to housing portion 112 via a hinge 116 providing a rotation for housing portion 114 to and from the first and the second positions as indicated by an arrow 152. Other suitable mechanisms for providing movement are known in the art and may be used accordingly.

Housing portion 112 defines a surface 120 (forming a front of housing 105), a surface 122 (forming a top side of housing 105), a surface 124 (forming a bottom side of housing 105), a surface 126 (forming a left side of housing 105), and a surface 128 (forming a right side of housing 105). Each of surfaces 122, 124, 126, and 128 meet with and are adjacent and generally perpendicular to surface 120. Widths of surfaces 122, 124, 126, and 128 are generally much smaller than a width of surface 120. For example, the width of surface 120 may be about four times that of each width of surfaces 122, 124, 126, and 128.

Preferably, the width of surface 120 is about 5 centimeters and each width of surfaces 122, 124, 126, and 128 is about 1.25 centimeters.

Housing portion 114 is sized and shaped similarly to that of housing portion 112 and includes similarly defined surfaces.

Sized and constructed as described above, mobile station 102 may be described as being "wearable," that is, it is sized to fit into a pocket or attach to clothing using a holster or a belt clip as will be shown and described further below in relation to FIG. 4.

User interface 106 includes a display area 130 for displaying information. User interface 106 may be referred to as a pager user interface. In the embodiment shown, display area 130 is carried on and outwardly directed from surface 122. Display area 130 presents visual information directed in a direction indicated by an arrow 154 of FIGS. 1 and 2. Display area 130 may include a display window and display elements discussed in more detail below.

User interface 108 includes a display area 132 for displaying information, a keypad 134, a speaker 136 disposed in housing portion 114, and a microphone 138 disposed in housing portion 112. User interface 108 may be referred to as a telephone user interface. Display area 132 is carried on and outwardly directed from surface 120. Display area 132 presents visual information in a direction indicated generally by an arrow 156 of FIG. 1. Display area 132 may include a display window and display elements discussed in more detail below.

When a user of mobile station 102 views display area 132 and any visual information displayed therein, display area 130 and any visual information therein is obstructed from view because of the particular orientations of display areas 130 and 132 on housing 105, and/or because of the position of housing portion 114 relative to housing portion 112. Likewise, when the user views display area 130 and any visual information therein, display area 132 and any visual information therein is similarly obstructed from view for the same or similar reasons.

Keypad 134 is carried on surface 120 and may include a plurality of telephone keys 140 and a plurality of function keys 142. The plurality of telephone keys 140 typically includes conventional telephone keys (0–9, *, and #) provided for initiating telephone calls. The plurality of function keys 142 typically includes conventional cellular telephone function keys, such as an on/off key, a function key, a send key, and an end key. Keypad 134 is operable for use when housing portion 114 is positioned in the open position. Display area 132 typically displays alphanumeric characters, such as telephone digits, corresponding to actuations at keypad 134. In the embodiment shown, user interface 108 is covered when housing portion 114 is positioned in the closed position. Mobile station 102 also includes a plurality of keys 144 disposed on surface 128. Here, the plurality of keys 144 includes a key 146, a key 148, and a key 150.

Mobile station 102 also includes a removable battery 128, carried on housing portion 114, provided for powering electrical circuitry, described below, of mobile station 102. Removable battery 128 includes battery contacts (not visible) which electrically couple to the electrical circuitry through hinge 116 via electrical conductors. Removable battery 128 includes a latching mechanism 202 (FIG. 2) which helps keep removable battery 128 attached to housing portion 114.

FIG. 3 shows an alternate embodiment of a mobile station, in particular a mobile station 302. Mobile station 302 includes a housing portion 304, a housing portion 306, a speaker 314 disposed in housing portion 306, a removable battery 312 carried on housing portion 306, a microphone 315 disposed in housing portion 304, and a keypad 316 carried on housing portion 304. Mobile station 304 also includes a display area 318 and a display area 320. Display area 318 is outwardly directed from a surface 310 of housing portion 304, and display area 320 is outwardly directed from a surface 308 of housing portion 306.

FIG. 4 shows a user wearing mobile station 102 in a holster 406. Here, the size of mobile station 102 is greatly exaggerated for illustration purposes only. Mobile station 102 is inserted within a holding portion of holster 406, and holster 406 is attached to an item of clothing of the user via a belt clip (not visible) of holster 406.

Figure 5:
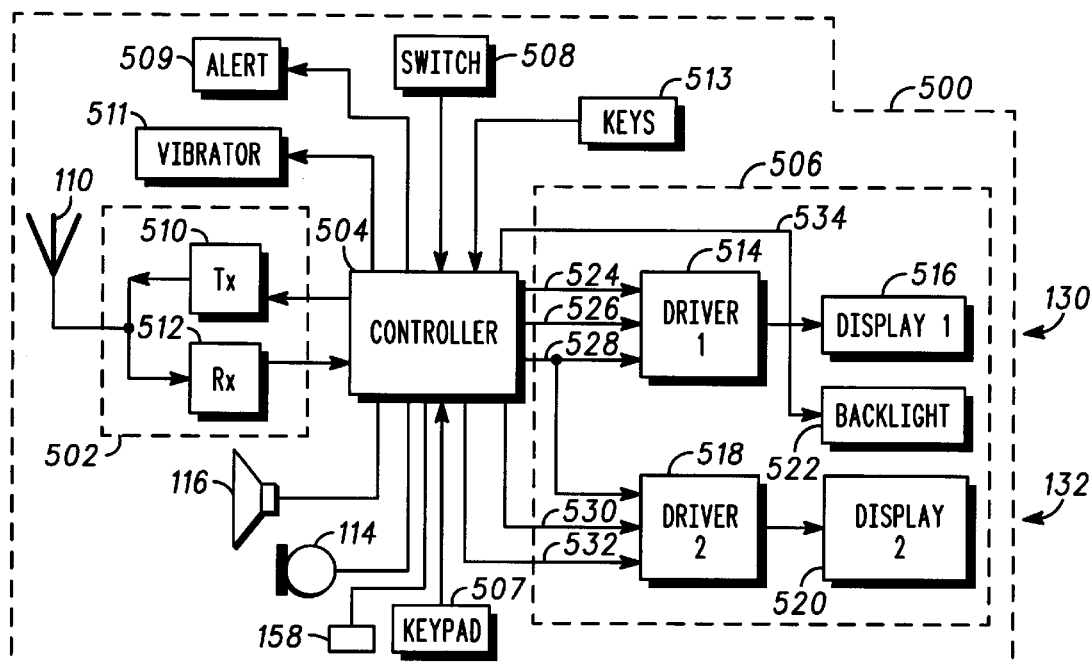
FIG. 5 is a schematic block diagram of electrical circuitry of the mobile station.

FIG. 5 shows a schematic block diagram of electrical circuitry 500 of mobile station 102. Electrical circuitry 500 includes a tranceiver 502, a controller 504, display components 506, a keypad circuit 507, a switch 508, an alert 509, a vibrator 511, a key circuit 513, microphone 114, and speaker 116. Preferably, most of electrical circuitry 500, including transceiver 502 and controller 504 which consume a large portion of physical space, is disposed in housing portion 112 on a printed circuit board (PCB) in housing portion 112.

Transceiver 502 is coupled to antenna 110 and includes a transmitter 510 and a receiver 512. Receiver 512 receives RF signals through antenna 110 and demodulates the RF signals. Controller 504 is coupled to and receives the demodulated information from receiver 512. Such information includes control information and may include voice information which is processed and sent to speaker 116.

Controller 504 is coupled to transmitter 510 and sends information thereto for transmission. Such information includes control information and may include voice information received from microphone 114. Microphone 114 and speaker 116 are coupled to controller 504 through audio circuitry (not shown). A speaker and mic accessory 536, which includes an ear speaker and a microphone coupled to a plug via a cord, can insert into accessory jack 536 and couple to controller 504.

Keypad circuit 509 provides signals to controller 504 in response to actuations of keys at keypad 134 (FIG. 1). Similarly, key circuit 513 provides signals to controller in response to actuations-of the plurality of keys 144 (FIG. 1). Switch 508 provides signals to controller 504 in response to movements of housing portion 114 to and from the first and the second positions. Preferably, switch 508 comprises a magnetic switch. In response to receiving a call from a remote unit, controller 504 controls alert 509 to sound an audible alert signal or controls vibrator 511 to vibrate.

In the embodiment shown in FIG. 5, display components 506 include a driver 514, a display element 516, a driver 518, a display element 520, and a backlight 522. Controller 504 generates display data to be displayed at display areas 130 and 132 (FIG. 1). Controller 504 controls power to driver 514 and display element 516 through a line 524. Similarly, controller 504 controls power to driver 518 and display element 520 through a line 530. Controller 504 selects one of drivers 514 and 518 to receive display data through a line 526 (for driver 514) and a line 532 (for driver 518), and sends the display data via a data bus 528 coupled to both of drivers 514 and 518. Controller 504 controls power to backlight 522 through a line 534.

Display elements 516 and 520 provide visual information in display areas 130 and 132, respectively, for a user of mobile station 102. Each of display elements 516 and 520 may comprise any suitable display or displays such as a light emitting diode (LED) display or a liquid crystal diode (LCD) display. In addition to having illuminating segments or pixels, such displays may include illuminating icons. Typically, display elements 516 and 520 are substantially planar and rectangular in shape and thus, for the embodiment shown in FIGS. 1 and 2, are positioned substantially perpendicular to one another in housing portion 112.

Preferably, display element 516 is a single line LCD display and display element 520 is a multiple line LCD display. Also preferably, display element 520 has a resolution greater than a resolution of display element 516. If both of display elements 516 and 520 are LCD displays, backlight 522 is preferably designed and positioned such that backlighting is provided for both of display elements 516 and 520. Also preferably, display components 506 are mounted to a secondary printed circuit board (PCB) that is different from a main PCB holding a remaining portion of electrical circuitry 500 (such as transceiver 502 and controller 504). Here, the secondary PCB is attached and coupled to the main PCB via a flex connector.

Figure 6:
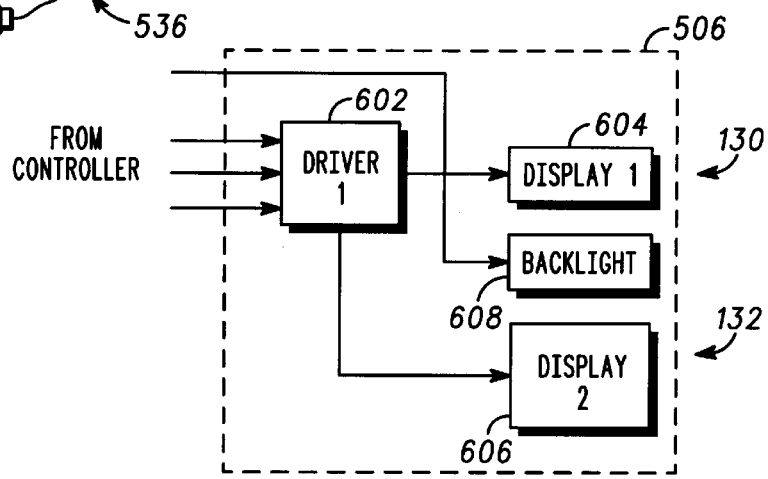
FIG. 6 is a schematic block diagram of a first alternate embodiment of display components of the electrical circuitry.

FIG. 6 shows a first alternate embodiment of display components 506. Here, display components 506 include a driver 602, a display element 604, a display element 606, and a backlight 608.

Display element 604 provides visual information in display area 130, and display element 606 provides visual information in display area 132. Display elements 604 and 606 share driver 602. Preferably, driver 602 and display element 606 are mounted on a secondary PCB and coupled to the main PCB via a first flex connector, and display element 604 is coupled and attached to the secondary PCB via a second flex connector. Since the second flex connector is flexible, display element 604 and display element 606 may be appropriately configured and positioned within housing portion 112.

Figure 7:
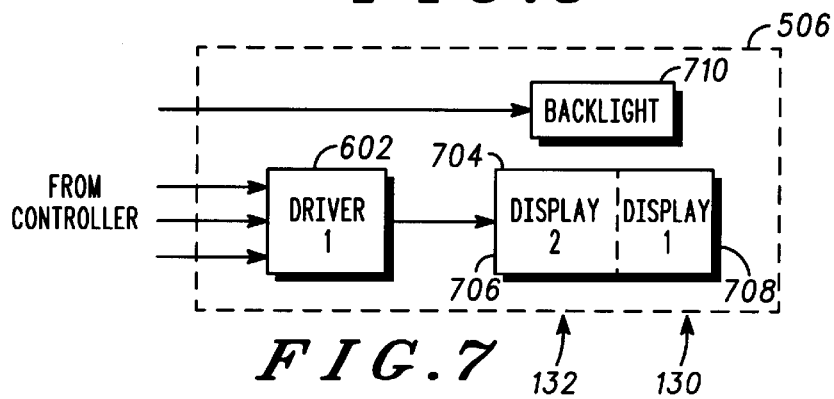
FIG. 7 is a schematic block diagram of a second alternate embodiment of the display components.

FIG. 7 shows a second alternate embodiment of display components 506. Here, display components 506 include a driver 702, a flexible display element 704, and a backlight 710. Flexible display element 704 is indeed flexible, and comprises a display portion 706 and a display portion 708. Display portion 706 provides information for display area 130, and a display portion 708 provides information for display area 132. As can be understood from the configuration of display areas 130 and 132 shown in FIG. 1, flexible display element 704 is bent or curved within housing portion 112 such that display portion 706 is substantially perpendicular relative to display portion 708.

Figure 8A:
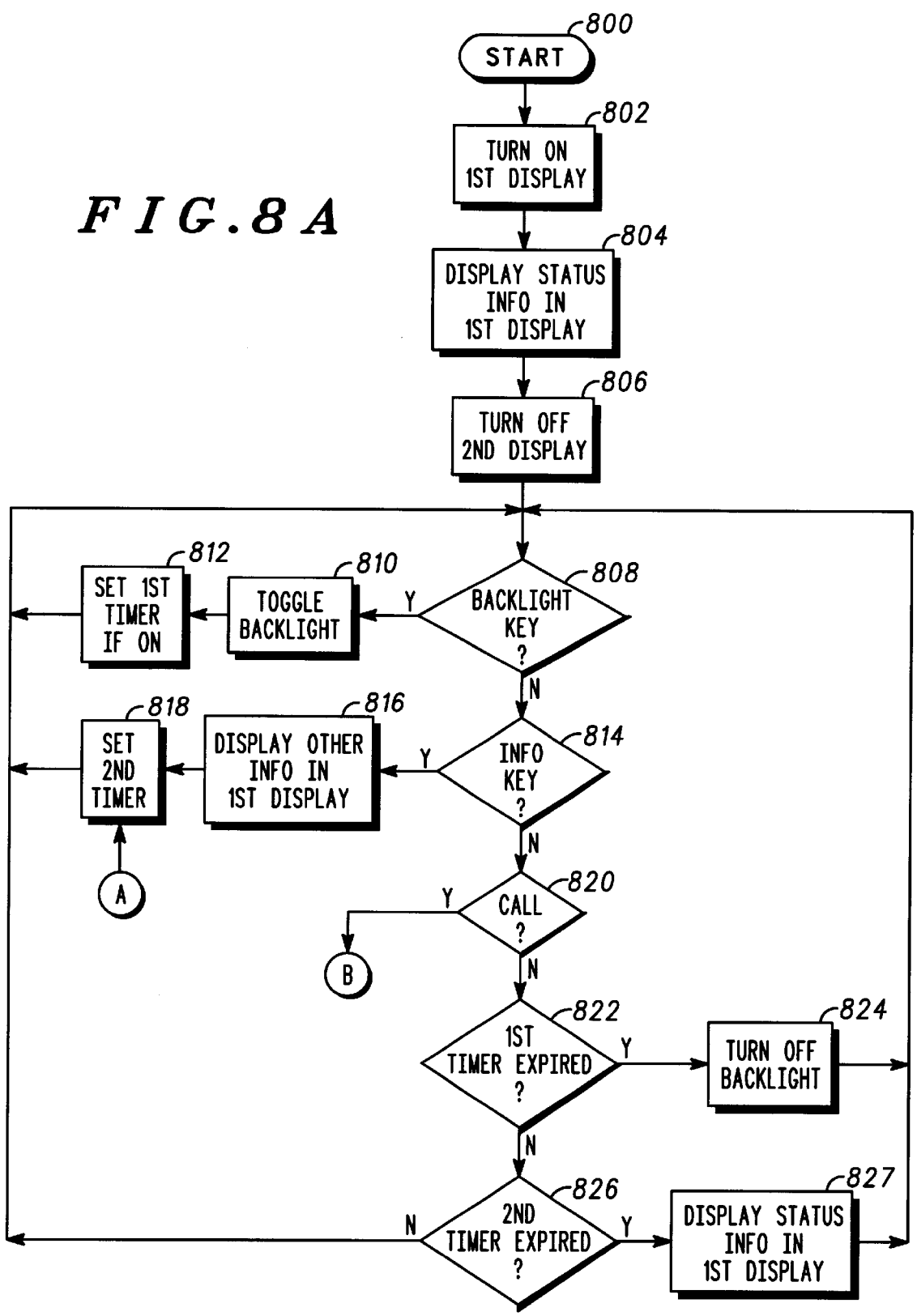
FIG. 8A is a first part of a flowchart describing the operation of the mobile station.
Figure 8B:
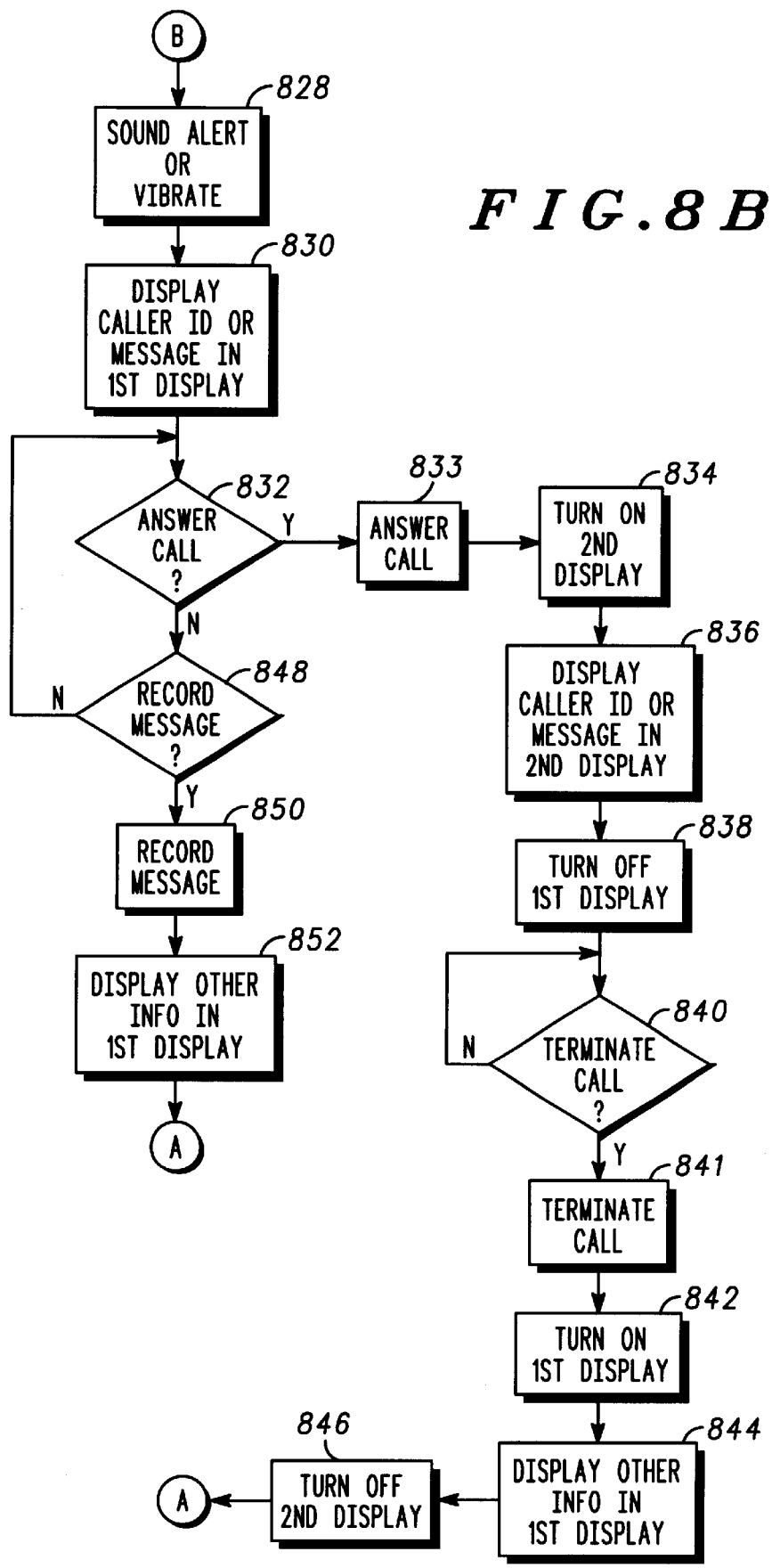
FIG. 8B is a second part of the flowchart describing the operation of the mobile station.

FIGS. 8A and 8B show a flowchart describing a method of operating electrical circuitry 500 of mobile station 102. The method described here utilizes display components 506 shown and described in relation to FIG. 5. Mobile station 102 is in a standby mode of operation. At start block 800, housing portion 114 is positioned from the open position to the closed position. Controller 504 enables power to driver 514 and display element 516 through line-524 (step 802). Controller 504 enables driver 514 for data communication via line 526, and sends display data thereto. Driver 514 sends data to display element 516 for displaying visual information, preferably status information, in display area 130 (step 804). If power was previously enabled for driver 518 and display element 520, controller 504 disables power thereto (step 806).

Here, the status information may include date and time information, battery status information such as a battery level indication and/or a low battery warning indication, communication status information such as an "in use" indication and/or a roam indication, or any combinations of the above. Alternatively, the status information may include little or no information, where display area 130 is cleared.

Controller 504 reads key circuitry 513 to detect actuations of the plurality of keys 144. If controller 504 detects an actuation of key 146 (step 808), controller 504 toggles the on/off state of backlight 522 (step 810). That is, controller 504 turns on backlight 522 if backlight 522 is off, and turns off backlight 522 if backlight 522 is on. If backlight 522 is turned on from step 810, controller 504 sets a timer to turn off backlight 522 after an expiration of a predetermined time period (step 812).

If controller 504 detects an actuation of key 150 (step 814), controller 504 sends display data to driver 514, which sends display data to display element 516. Thus displaying new visual information in display area 130. The new visual information includes information different from or in addition to the status information, and may include date and time information, battery status information such as a battery level indication and/or a low battery warning indication, communication status information such as an "in use" indication and/or a roam indication, or any combinations of the above. Controller 504 sets a timer related to the new display information (step 818).

If controller 504 detects an incoming call (step 820), the method continues in FIG. 8B. Controller 504 controls alert 509 to sound an audible alert signal (step 828). Alternatively at step 828, controller may control vibrator 511 to vibrate. Receiver 512 demodulates the received RF signals and generates data signals such as caller ID or short messaging data. Controller 504 receives such data, generates display data and sends it to driver 514 via line 528 for displaying visual information in display area 130 corresponding to such data. For example, display area 130 may display caller ID data in a manner similar to that shown in FIG. 2. When a large amount of information is to be displayed, controller 504 may control driver 514 such that display area 516 scrolls the information (from left to right, for example) or periodically flashes new information.

Controller 504 detects a control signal from switch 508 when housing portion 114 is moved from the closed position to the open position (step 832), which here signfies an intention to answer the call. In response to such detection, mobile station 102 answers the call (step 833). Controller 504 enables power to driver 518 and display element 520 corresponding to display area 132 via line 530 (step 834). Controller 504 enables driver 518 for data communication via line 532, and sends the display data to driver 518 via data bus 528. Driver 518 sends data to display element 520, and visual information is displayed in display area 132 (step 836). Controller 504 powers off driver 514 and display element 516 via line 524, thereby turning off display area 130 (step 838).

Preferably, the visual information corresponding to step 836 includes the caller ID or short messaging data obtained upon receipt of the call. For example, the visual information may include the caller ID data and may be displayed as shown in FIG. 1. Since display area 132 is preferably larger or is capable of displaying more visual information than display area 130, display area 132 may display the visual information in its entirety, whereas display area 130 may have had to display the visual information by scrolling or other methods known in the art.

At step 832, when speaker and mic accessory 536 is inserted in accessory jack 158, an actuation of one of the plurality of keys 144 may answer the call without having to move housing portion 114 to the open position (and also without having to remove mobile station 102 from a holster). After the call is completed, an actuation of one of the plurality of keys 144 may terminate the call.

If the call is a two-way call, such as a two-way telephone or telephone-like call, the user of mobile station 102 uses microphone 114 and speaker 116 for voice communication. Controller 504 detects a control signal from switch 508 when housing portion 114 is moved from the open position to the closed position (step 840). In response to such detection, controller 504 performs tasks to terminate the call (step 841). In addition, controller 504 powers on driver 514 and display element 516 via line 524 (step 842). Controller 504 enables driver 514 for data communication via line 526 and sends display data thereto via data bus 528. Driver 514 sends data to display element 516 to display visual information corresponding to such data in display area 130 (step 844). Controller 504 disables power from driver 518 and display element 516, thereby turning off display area 132 (step 846). The method continues back at step 808 in FIG. 8A.

The visual information corresponding to step 844 may be the same as that described in relation to step 804 (time, date, etc.). Preferably, the visual information corresponding to step 844 includes information regarding the two-way call, such as the duration of the call, "units" of time used for the call, the amount of money charged for the call, or any combination of the above. Such information may be real or approximated; base station 104 may send this information to mobile station 102 and/or mobile station 102 may be equipped with a real time clock (not shown). Also preferably, if such preferred information is displaced, display area 516 displays similar or the same visual information as that described in relation to step 804 (time, date, etc.) after an expiration of a predetermined time period or after an actuation of one of the plurality of keys 144.

At step 832, housing portion 114 may not be opened after a detection of the incoming call, and thus controller 504 may not detect the control signal from switch 508. Controller 504 may detect an actuation of one of the plurality of keys 144 via key circuit 513 (step 848). In response thereto, controller 504 initiates an immediate forwarding of the incoming call to voice mail or to an answering device with memory, where a synthesized message is played to a caller and a voice message may be recorded (step 850).

At step 848, none of the plurality of keys 144 may be actuated after a detection of the incoming call, and thus controller 504 may not detect any signals from key circuit 513. Controller 504 continues to monitor detection of signals from switch 508 and key circuit 513 in steps 832 and 848.

The option described in relation to steps 848 and 850 may be preferred when it is not desired to answer the incoming call (perhaps upon viewing the visual information in display area 130) and to hear or feel signals from alert 509 or vibrator 511 for a long duration of time.

Mobile station 102 may operate display areas 130 and 132 in response to other input signals. For example, FIG. 4 shows a view 400 of a holster 408 having a side 410. Mobile station 102 has electrical contacts 404 (also FIG. 4) on a rear side 402 thereof. On an inside of side 410, holster has a conductive element 412 having a contact 412 and a contact 414. When mobile station 102 is outside of holster 408, display area 130 is powered off and display area 132 is powered on (if exposed). When mobile station 102 is inserted into holster 408, two of electrical contacts 404 are shorted from conductive element 412 and, in response to this, display area 130 is powered on by controller 504 while display area 130 is powered off.

FIG. 9 shows another alternate embodiment of a mobile station, in particular a mobile station 900. Mobile station 900 includes a housing portion 902 and a housing portion 904 coupled together via a hinge 905, where housing portion 904 is movable from open and closed positions. In FIG. 9, housing portion 904 is shown in the open position. Mobile station 902 also includes a retractable antenna 906 outwardly extendable from housing portion 902, a speaker 908 disposed in and outwardly directed from housing portion 902, a microphone 910 disposed in and outwardly directed from housing portion 904, and a keypad 912 carried on housing portion 902. Mobile station 902 includes a display area 914 outwardly directed from a front of housing portion 902, and a display area 916 outwardly directed from housing portion 904. When housing portion 904 is moved to the closed position, display area 916 is obstructed from view, whereas display area 916 is available for viewing. Display area 914 preferably includes a single line LED display, and display area 916 preferably includes a large graphics LCD display. Mobile station 902 operates similarly or in the same way as mobile station 102 as described in relation to the flowchart of FIGS. 8A and 8B.

While particular embodiments of the present invention have been shown and described, modifications may be made. For example, display area 130 of FIG. 1 may be placed along any suitable side of housing portions 112 and 114 for displaying visual information to a user. It is therefore intended in the appended claims to cover all such changes and modifications which fall within the true spirit and scope of the invention.

What is claimed is:

1. A portable communication device with first and second display areas, the device comprising:
    a common flexible display element wherein the first and second display areas are substantially perpendicular to each other and the common display element is bent to provide display portions to both the first and second display areas;
    a radio transceiver configured to detect incoming paging calls and incoming telephone calls from a calling unit and to receive information corresponding thereto; and
    a controller coupled to the transceiver and the display areas, the controller provides status information of the communication device and controls said first display area to display one of paging information and communication device status information therein and controls said second display area for displaying at least one of telephone call information, paging information and device status information therein, upon connection of the incoming call the controller transfers the information displayed in the first display area to the second display area, and turns off the first display area.

2. The portable communication device according to claim 1, wherein the device status information is alphanumeric information including at least one of date and time information, battery level indication, communication "in use" indication, roam indication, duration of a call, "units" of time used for a call, and an amount of money charged for a call.

3. The portable communication device according to claim 1, further comprising a backlight for the first and second display areas, the backlight is adapted to be independently toggled between on and off states through the actuation of a key.

4. The portable communication device according to claim 1, wherein said paging information includes messaging data and caller identification (caller ID) information of a calling unit upon receipt of a call therefrom.

5. The portable communication device according to claim 1, wherein upon actuation by a key on the communication device an incoming call is immediately forwarded to an answering system with memory, wherein a message is played to a caller and a message from the caller can be recorded.

6. The portable communication device according to claim 1, further comprising a movable element movable between an open position and a closed position detectable by the controller, wherein the movable element serves to cover the second display area in the closed position, and wherein
    when said movable element is moved from the closed position to the open position said controller directs said transceiver to connect to the incoming call, transfer the information displayed in the first display area to the second display area, and turn off the first display area, when said movable element is moved from the open position to the closed position said controller directs said transceiver to terminate the call, and when said movable element is not opened after a detection of the incoming call, said controller initiates an immediate forwarding of the incoming call to a storage apparatus wherein one of a message is played to a caller and a message is recorded.

7. A portable communication device with first and second display areas, the device comprising:

a common flexible display element wherein the first and second display areas are substantially perpendicular to each other and the common display element is bent to provide display portions to both the first and second display areas;

a radio transceiver configured to detect incoming paging calls and incoming telephone calls from a calling unit and to receive information corresponding thereto;

a controller coupled to the transceiver and the display areas, the controller provides status information of the communication device and controls said first display area to display one of paging information and communication device status information therein and controls said second display area for displaying at least one of telephone call information, paging information and device status information therein, upon connection of the incoming call the controller transfers the information displayed in the first display area to the second display area, and turns off the first display area; and a key on the communication device, wherein upon actuation by the key an incoming call is immediately forwarded to an answering system with memory, wherein a message is played to a caller and a message from the caller can be recorded.

8. The portable communication device according to claim 7, wherein the device status information is alphanumeric information including at least one of date and time information, battery level indication, communication "in use" indication, roam indication, duration of a call, "units" of time used for a call, and an amount of money charged for a call.

9. The portable communication device according to claim 7, further comprising a backlight for the first and second display areas, the backlight is adapted to be independently toggled between on and off states through the actuation of a key.

10. The portable communication device according to claim 7, wherein said paging information includes messaging data and caller identification (caller ID) information of a calling unit upon receipt of a call therefrom.

11. The portable communication device according to claim 7, further comprising a movable element movable between an open position and a closed position detectable by the controller, wherein the movable element serves to cover the second display area in the closed position, and wherein when said movable element is moved from the closed position to the open position said controller directs said transceiver to connect to the incoming call, transfer the information displayed in the first display area to the second display area, and turn off the first display area, when said movable element is moved from the open position to the closed position said controller directs said transceiver to terminate the call, and when said movable element is not opened after a detection of the incoming call, said controller initiates an immediate forwarding of the incoming call to a storage apparatus wherein one of a message is played to a caller and a message is recorded.

* * * * *